United States Patent
Cheng

(10) Patent No.: US 11,419,021 B2
(45) Date of Patent: Aug. 16, 2022

(54) CONNECTION RE-DIRECTION METHOD FOR UE AND REMOTE ACCESS NODE, UE USING THE SAME AND REMOTE ACCESS NODE USING THE SAME

(71) Applicant: Industrial Technology Research Institute, Hsinchu (TW)

(72) Inventor: Ching-Wen Cheng, Tainan (TW)

(73) Assignee: Industrial Technology Research Institute, Hsinchu (TW)

(*) Notice: Subject to any disclaimer, the term of this patent is extended or adjusted under 35 U.S.C. 154(b) by 217 days.

(21) Appl. No.: 16/556,238

(22) Filed: Aug. 30, 2019

(65) Prior Publication Data

US 2020/0077310 A1 Mar. 5, 2020

Related U.S. Application Data

(60) Provisional application No. 62/725,277, filed on Aug. 31, 2018.

(51) Int. Cl.
*H04W 36/00* (2009.01)
*H04W 76/18* (2018.01)
*H04W 74/08* (2009.01)
*H04W 76/27* (2018.01)
*H04W 72/04* (2009.01)
*H04W 76/19* (2018.01)
(Continued)

(52) U.S. Cl.
CPC ..... *H04W 36/0079* (2018.08); *H04W 72/042* (2013.01); *H04W 74/0833* (2013.01); *H04W 76/18* (2018.02); *H04W 76/19* (2018.02); *H04W 76/27* (2018.02); *H04W 8/24* (2013.01); *H04W 76/20* (2018.02)

(58) Field of Classification Search
CPC ............. H04W 36/0079; H04W 76/18; H04W 74/0833; H04W 76/27; H04W 72/042; H04W 76/19; H04W 8/24; H04W 76/20; H04W 36/305
See application file for complete search history.

(56) References Cited

U.S. PATENT DOCUMENTS 9,112,758 B2 8/2015 Niu et al.
9,497,675 B2 * 11/2016 Chang ............... H04W 36/0085
(Continued)

FOREIGN PATENT DOCUMENTS

CN 109716809 5/2019
TW 200904078 1/2009

OTHER PUBLICATIONS

"Office Action of Taiwan Counterpart Application", dated Aug. 7, 2020, p. 1-p. 7.
(Continued)

*Primary Examiner* — Brian T O Connor
(74) *Attorney, Agent, or Firm* — JCIPRNET

(57) ABSTRACT

The disclosure is directed to a connection re-direction method used by a UE, a connection re-direction method used by a remote access node, a user equipment using the same method, and a remote access node using the same method. In an aspect, the connection re-direction method used by a UE includes receiving a network connection failure indication; and performing a handover procedure based on a pre-configured handover configuration in response to having received the connection failure indication.

40 Claims, 9 Drawing Sheets

(51) Int. Cl.
*H04W 76/20* (2018.01)
*H04W 8/24* (2009.01)

(56) References Cited

U.S. PATENT DOCUMENTS

| | | | |
|---|---|---|---|
| 9,510,255 B2* | 11/2016 | Xu | H04W 36/14 |
| 9,961,688 B1 | 5/2018 | Anvari | |
| 2013/0051214 A1* | 2/2013 | Fong | H04W 36/30 370/216 |
| 2015/0237571 A1 | 8/2015 | Laraqui et al. | |
| 2016/0192181 A1 | 6/2016 | Choi et al. | |
| 2017/0063586 A1 | 3/2017 | Sun et al. | |
| 2018/0007574 A1 | 1/2018 | Park et al. | |
| 2018/0092017 A1 | 3/2018 | Freda et al. | |
| 2018/0138957 A1 | 5/2018 | Wang et al. | |
| 2018/0279168 A1* | 9/2018 | Jheng | H04W 28/04 |
| 2018/0310202 A1* | 10/2018 | Lohr | H04W 76/19 |
| 2019/0069333 A1 | 2/2019 | Kim | |
| 2019/0104562 A1* | 4/2019 | Tsai | H04W 76/15 |
| 2019/0110244 A1* | 4/2019 | Shih | H04W 48/16 |
| 2019/0289661 A1* | 9/2019 | Chen | H04W 72/1284 |
| 2019/0313244 A1* | 10/2019 | Wang | H04W 8/24 |
| 2019/0313273 A1* | 10/2019 | Sharma | H04B 7/0408 |
| 2019/0320455 A1* | 10/2019 | Chen | H04W 68/02 |
| 2019/0349901 A1* | 11/2019 | Basu Mallick | H04W 72/042 |
| 2019/0394823 A1* | 12/2019 | Jo | H04W 76/11 |
| 2020/0413306 A1* | 12/2020 | Decarreau | H04W 36/0079 |
| 2021/0011813 A1* | 1/2021 | Zhang | H04L 41/0663 |
| 2021/0058837 A1* | 2/2021 | Cirik | H04W 72/0453 |
| 2021/0068191 A1* | 3/2021 | Liu | H04L 1/0061 |
| 2021/0084578 A1* | 3/2021 | Ingale | H04W 48/16 |
| 2021/0168666 A1* | 6/2021 | Li | H04W 36/00 |
| 2021/0235425 A1* | 7/2021 | Kim | H04W 72/042 |
| 2021/0314833 A1* | 10/2021 | Hao | H04W 76/19 |

OTHER PUBLICATIONS

3GPP TS 38.401 V15.2.0, "NG-RAN; Architecture description", Jun. 2018, pp. 1-39.
3GPP TS 38.470 V15.2.0, "NG-RAN; F1 general aspects and principles", Jun. 2018, pp. 1-12.
3GPP TS 38.473 V15.2.0, "NG-RAN; F1 application protocol (F1AP)", Jun. 2018, pp. 1-161.
3GPP TR 38.874 V0.3.2 "Study on integrated access and backhaul", Jul. 2018, pp. 1-40.
R2-1810530, "Handling of the RLF on wireless backhaul link", Jul. 2018, pp. 1-2.
R2-1811002, "Report of 3GPP TSG RAN2 NR AdHoc 1807 meeting, Montreal, Canada", Aug. 2018, pp. 125-129.

* cited by examiner

CONNECTION RE-DIRECTION METHOD FOR UE AND REMOTE ACCESS NODE, UE USING THE SAME AND REMOTE ACCESS NODE USING THE SAME

CROSS REFERENCE TO RELATED APPLICATION

This application claims the priority benefit of U.S. provisional application Ser. No. 62/725,277 filed on Aug. 31, 2018. The entirety of the above-mentioned patent application is hereby incorporated by reference herein and made a part of specification.

TECHNICAL FIELD

The disclosure is directed to a connection re-direction method used by a user equipment (UE), a connection re-direction method used by a remote access node, a user equipment using the same method, and a remote access node using the same method.

BACKGROUND

Currently in 5G communication network, a gNB could be deployed in a central unit (CU)-distributed unit (DU) like topology in order to extend the network coverage and to reduce the network expenditure (CAPEX). FIG. 1 shows a typical architecture used by a 5G communication network in which a gNB is deployed as having multiple parts including a gNB-head CU, a gNB-head DU, one or more gNB-remote DUs, and etc. One or more UEs could be attached to each of the multiple parts. The CU of a gNB hosting RRC, SDAP and PDCP. The DU of a gNB hosting RLC, MAC, and PHY. The gNB-head CU would connect with more than one gNB-remote DU at a time. Further, a UE may connect to multiple gNB-remote (DU) simultaneous for purposes including a dual connectivity (DC) operation.

In general, a gNB may contain a gNB-CU and one or more gNB-DUs. The gNB-CU would function as a logical node hosting radio resource control (RRC), service data adaptation protocol (SDAP) and packet data convergence protocol (PDCP) protocols of the gNB or RRC and PDCP protocols of the en-gNB that controls the operation of one or more gNB-DUs. The gNB-DU would function as a logical node hosting RLC, MAC and PHY layers of the gNB or en-gNB, and the operation of the gNB-DU is partly controlled by gNB-CU. One gNB-DU may support one or multiple cells, but one cell is supported by only one gNB-DU. One gNB-DU is connected to only one gNB-CU. A backhaul connection is a connection between a gNB-CU and a gNB-DU, or a connection between two gNB-DUs. The direction toward the gNB-CU in the topology is referred to as upstream, the direction towards UE in the topology is referred to as downstream.

The communication network may handle the generation and delivery of system information (SI) by using the gNB-DU to generate and encode Master Information block (MIB) and System Information Block (SIB) 1, and the gNB-CU generates and encodes SI messages which contain all SIBs except SIB 1. The SI is then broadcasted, and the scheduling of the broadcasts of SI messages is carried out in the gNB-DU. As for the generation and delivery of paging messages, the communication network may use the gNB-CU to initiate a paging procedure by sending a paging message, and subsequently the gNB-DU may determine the final paging cycle for the UE.

One of the current challenges of the 5G communication network is that a gNB-DU may fail to connect. As shown in FIG. 2 S201, such connection failure between a gNB-CU and one of the gNB-DUs may result in a radio access network (RAN) connection failure such as an RRC error or a PDCP error. From the perspective of a UE, the connection to the gNB appears to have remained, but the UE might be unable to detect the connection failures in the backhaul level based on a radio resource management (RRM) measurement such as in response to a UplinkInformationTransfer (i.e. NAS message) transmission failure which is a timer value measured in the unit of seconds. A connected UE may require a long period of time to detect a network connection failure such as in response to an expiration of the variable DataInactivityTimer (i.e. RRC connection failure and go into RRC_IDLE) which is set by a Long Term Evolution (LTE) system according to one of the set intervals including {s1, s2, s3, s5, s7, s00, s15, s20, s40, s50, s60, s80, s100, s120, s150, s180}. Similarly, a connected UE may also require a long period of time detect a network connection failure such as in response to an expiration of the variable discardTimer (i.e. PDCP SDU transmission failure) which is set by a New Radio (NR) system according to one of the set intervals including {ms10, ms20, ms30, ms40, ms50, ms60, ms75, ms100, ms150, ms200, ms250, ms300, ms500, ms750, ms1500, infinity}.

When a backhaul connection error occurs, all UEs served by a gNB-remote/DU would be impacted when the gNB-remote/DU has lost the connection with the gNB-head/CU, and such event may bring about a massive amounts of cell selections or RRC connection establishments for all the affected UEs. As seen in the example of FIG. 3, when the gNB-remote 1/DU1 has lost its connection (S301) with the gNB-head/CU, the UE would need to transfer to RRC_IDLE and establish connections from scratch, even when the Secondary Cell Group (SCG) or PSCell (Primary Secondary Cell) was configured for the UE. The UE would then need to perform a cell selection in order to reestablish UE context and connections with the RAN or with core network (CN). As such, all the ongoing control plan (CP) and user plan (UP) traffic would be interrupted. Therefore, upon detecting a backhaul connection failure, a connection re-direction method would be needed to reduce the impact such backhaul connection failure.

SUMMARY OF THE DISCLOSURE

Accordingly, the disclosure is directed to a connection re-direction method used by a UE, a connection re-direction method used by a remote access node, a user equipment using the same method, and a remote access node using the same method.

In an aspect, the disclosure is directed to a connection re-direction method used by a UE. The method includes not limited to: receiving a network connection failure indication; and performing connection change procedure.

In an aspect, the disclosure is directed to a UE. The UE includes not limited to: a receiver; and a processor coupled to the receiver and configured to: receive, via the receiver, a network connection failure indication; and perform a connection change procedure.

In an aspect, the disclosure is directed to a connection re-direction method used by a remote access node. The method includes not limited to: detecting a backhaul connection failure of a backhaul connection with an upstream node; and transmitting a network connection failure indication from the downstream node in response to having detected the backhaul connection failure.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
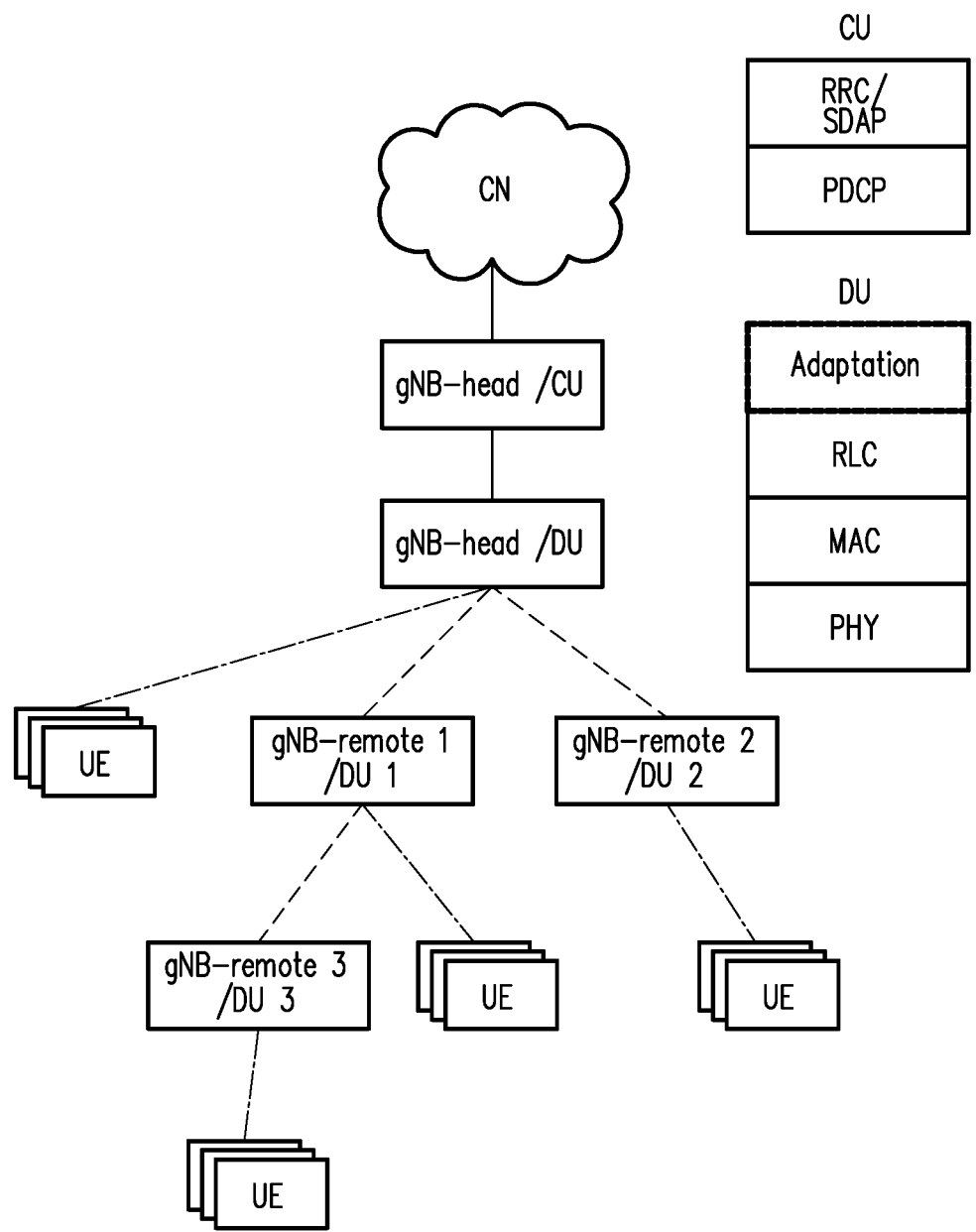
FIG. 1 illustrates a gNB-CU-gNB-DU type of topology which has been proposed for a 5G communication system.
Figure 2:
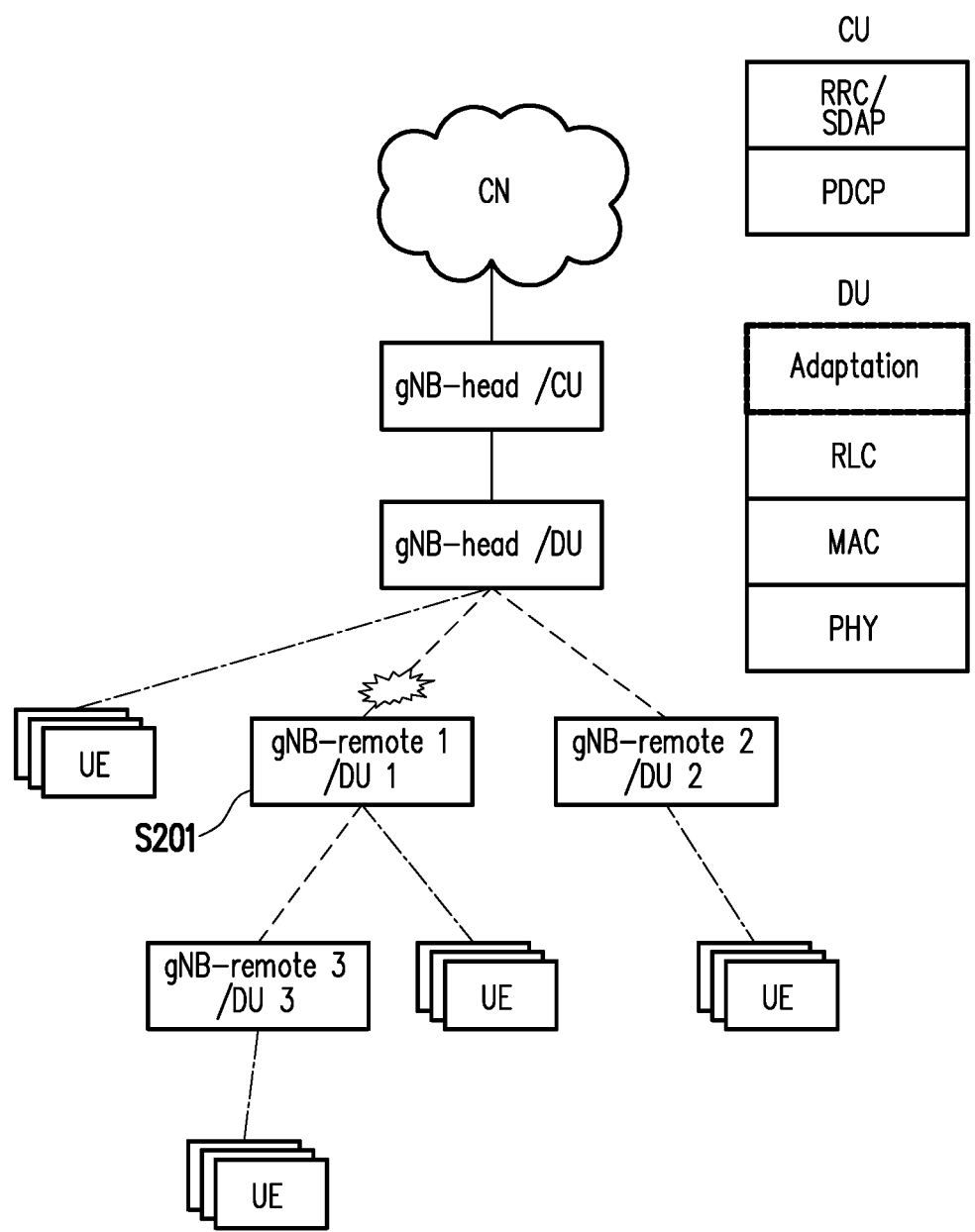
FIG. 2 illustrates a connection failure between a gNB-head DU and a gNB-remote DU resulting in a backhaul connection failure in the 5G communication system.
Figure 3:
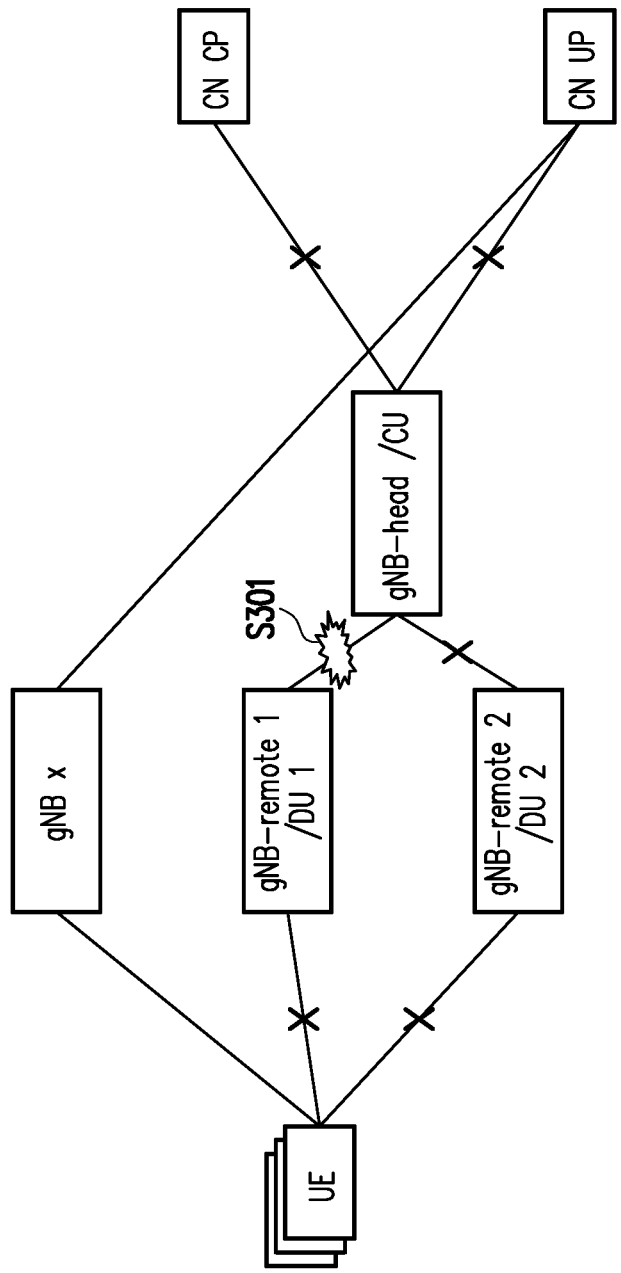
FIG. 3 illustrates a UE attempting to re-establish a connection after a connection failure in the 5G communication system.

Reference will now be made in detail to the present exemplary embodiments of the disclosure, examples of which are illustrated in the accompanying drawings. Wherever possible, the same reference numbers are used in the drawings and the description to refer to the same or like parts.

In order to reduce the amount of required network activities upon detecting a backhaul connection failure, a connection re-direction method would be needed to minimize the impact such backhaul connection failure. Therefore, the disclosure provides various approaches to be described as follows. Upon detecting a backhaul connection failure, the gNB-remote/DU which has detected the failure would be prevented from being selected as a serving cell or a campable cell for UEs. To be prevented from being selected as a serving cell or a campable cell for UEs, the gNB-remote/DU may set the variable cellBarred field in the MIB to prevent itself from being selected as a campable cell. The gNB-remote/DU would then stop transmitting reference signals.

The gNB-remote/DU would transmit a network connection failure indication to one or more UEs attached to the gNB-remote/DU so as to trigger a connection redirection upon determining that a backhaul connection failure has occurred. A backhaul connection failure could be defined as a direct connection failure between a gNB-head/CU and a gNB-head/DUs or a connection failure in one or more intermediate connections between the gNB-head/CU and the gNB-remote/DU. In response to detecting backhaul connection failure, the gNB-remote/DU may implement a pre-configured handover procedure which could be triggered by the gNB-remote/DU to initiate the handover procedure. The trigger for the pre-configured handover procedure could be communicated through a media access control (MAC) control element (CE), a downlink control information (DCI), or an RRC message such as a system information. The gNB/DU may then transmit a network connection failure indication to the UE to inform the UE that the network connection has failed by means including MAC, DCI, or an RRC message such as a system information. The UE may then perform a connection redirection procedure to connect to another network access node in response to receiving the network connection failure indication from its serving gNB-remote/DU.

In order for the network to implement the connection re-direction method, the disclosure provides several exemplary embodiments. For the first, second, and third exemplary embodiment, a gNB-head/CU would provide a handover pre-configuration to a UE. A gNB-remote/DU would send a network connection failure indication in response to detecting a backhaul connection failure in the upstream nodes. The upstream nodes may include all network access nodes between the gNB-remote/DU and the gNB-head/CU in the RAN and may further include the network nodes in the core network. All remote access nodes and UEs in the downstream of the gNB-remote/DU would then change its connection in response to receiving the network connection failure indication. The downstream nodes may include network access nodes or UEs served by the gNB-remote/DU.

For the fourth exemplary embodiments, the gNB-head/CU does not provide any handover pre-configuration to the UE. The gNB-remote/DU would send a network connection failure indication in response to detecting a backhaul connection failure. The gNB-remote/DU may provide a configuration for cell change to remote access nodes and UEs in its downstream. The remote access nodes and UEs in its downstream would then change its connection in response to receiving the network connection failure indication. Each of the exemplary embodiments are explained in further details.

Figure 4:
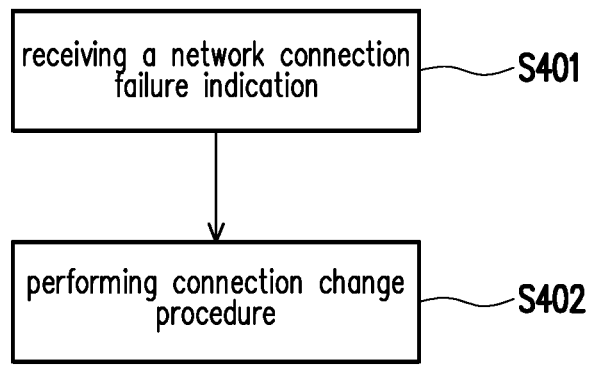
FIG. 4 illustrates a connection re-direction method from the perspective of a UE in accordance with one of the exemplary embodiments of the disclosure.

FIG. 4 illustrates a connection re-direction method from the perspective of a UE in accordance with one of the exemplary embodiments of the disclosure. In step S401, the UE would receive a network connection failure indication. In step S402, the UE would perform a connection change procedure.

According to one of the exemplary embodiments, the connection change procedure could be a mobility procedure, wherein the mobility procedure could be a handover procedure or a connection re-establishment procedure. The connection change procedure could be based on the information carried in the network connection failure indication. If a UE have received a pre-configured handover configuration and the pre-configured handover configuration is valid (i.e., the pre-configured handover configuration is provided via the serving gNB-remote/DU or serving gNB-head/DU, and a validity time is not exceeded if the validity time is associated with the pre-configured handover configuration), then the UE may perform a handover procedure as the connection change procedure based on the pre-configured handover configuration in response to having received the network connection failure indication.

According to one of the exemplary embodiments, receiving the network connection failure indication would involve receiving the network connection failure indication via a DCI which is scrambled by a C-RNTI or scrambled by a P-RNTI or scrambled by a SI-RNTI. In one or more of the subsequent embodiments, the DCI may consist of one or more bits. The DCI could be a DCI for physical downlink control channel (PDCCH) or physical downlink shared channel (PDSCH).

According to one of the exemplary embodiments, receiving the network connection failure indication would involve receiving the network connection failure indication via a MAC CE which may include a network connection failure indicator. The MAC CE may include a field of network connection failure indicator to indicate a network connection failure, and the MAC CE may further indicate a candidate target cell.

According to one of the exemplary embodiments, transmitting the network connection failure indication may involve transmitting the network connection failure indication via a MAC CE which may include a network connection failure indicator, and may further transmit a MAC CE which indicate a candidate target cell.

According to one of the exemplary embodiments, receiving the network connection failure indication would involve receiving the network connection failure indication via a RRC message which is transmitted through a BCCH and indicating the network connection failure in a system information. The network connection failure could be indicated via a MIB with a value of cellBarred field be set as "barred", or the network connection failure could be indicated via a SIB1 when the scheduling information of SIB1 indicates a broadcasting status of a specific SIB as "broadcasting". Or the network connection failure could be indicated when SIB1 stopped transmitting, and the MIB may still be transmitting, or the network connection failure could be indicated when the UE has detected that the MIB has stopped transmitting.

According to one of the exemplary embodiments, the method may further include receiving a pre-configured handover configuration before a network connection failure indication has been received and the pre-configured handover configuration includes a candidate target cell, and performing the handover procedure based on the pre-configured handover configuration may further involve connecting to the candidate target cell in response to having received the network connection failure indication. The pre-configured handover configuration further includes one of the following: a candidate target cell identity, a UE identity for connecting to the candidate target cell, a preamble for performing random access procedure to the candidate target cell, a time and frequency radio resource for performing random access procedure to the candidate target cell in response to having received a network connection failure indication.

According to one of the exemplary embodiments, the pre-configured handover configuration is associated with a predetermined time limit, and performing the handover procedure based on the pre-configured handover configuration may further involve connecting to the candidate target cell in response to having received a network connection failure indication when the predetermined time limit is not exceeded. The UE may not performing the handover procedure based on the pre-configured handover configuration upon an expiration of a predetermined time limit.

According to one of the exemplary embodiments, connecting to the candidate target cell may further involve performing a random-access procedure if the candidate target cell is not a PSCell or a PUCCH SCell (i.e, a Secondary Cell configured with PUCCH). The UE may perform the connection change procedure which includes performing a connection re-establishment procedure n response to not having a valid pre-configured handover configuration and may further avoid selecting the current serving cell (e.g., consider the current serving cell as one of the blacklist cell).

Figure 5:
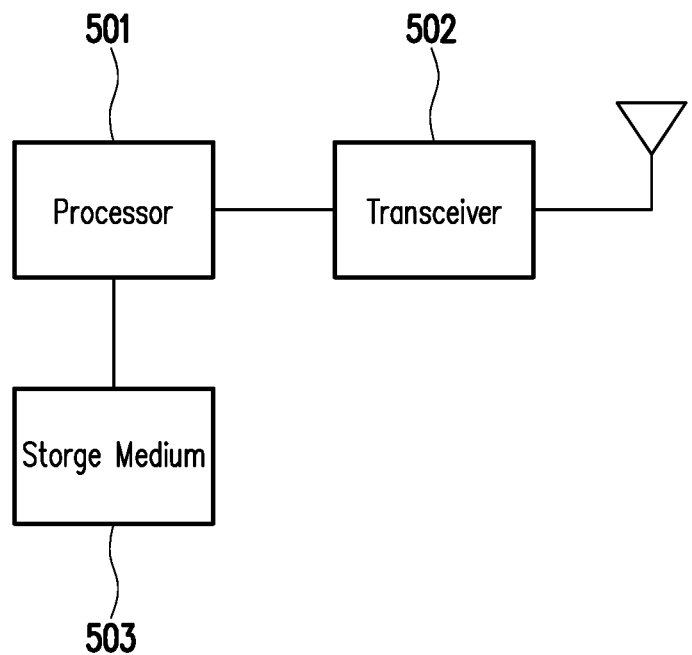
FIG. 5 illustrates the hardware block diagram of a UE in accordance with one of the exemplary embodiments of the disclosure.

FIG. 5 illustrates the hardware block diagram of a UE in accordance with one of the exemplary embodiments of the disclosure. The exemplary UE would include not limited to a processor 501 electrically connected to a transceiver 502 and a non-transitory storage medium 503 and configured at least for implementing the connection re-direction method described in FIG. 4 as well as its exemplary embodiments and alternative variations.

The hardware transceiver 502 may include one or more transmitters and receivers configured to transmit and receive signals respectively in the radio frequency or in the mmWave frequency. The hardware transceiver 502 may also perform operations such as low noise amplifying, impedance matching, frequency mixing, up or down frequency conversion, filtering, amplifying, and so forth. The hardware transceiver 502 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 502 may further include an antenna array which may include one or multiple antennas to transmit and receive omni-directional antenna beams or directional antenna beams.

The hardware processor 501 is configured to process digital signals and to perform procedures of the proposed method of network slicing in accordance with the proposed exemplary embodiments of the disclosure. The non-transitory storage medium 503 would store programming codes, codebook configurations, buffered data, and record configurations assigned by the hardware processor 501. The hardware processor 501 could be implemented by using programmable units such as a micro-processor, a micro-controller, a DSP chips, FPGA, etc. The functions of the hardware processor 501 may also be implemented with separate electronic devices or ICs. It should be noted that the functions of hardware processor 501 may be implemented with either hardware or software.

Figure 6:
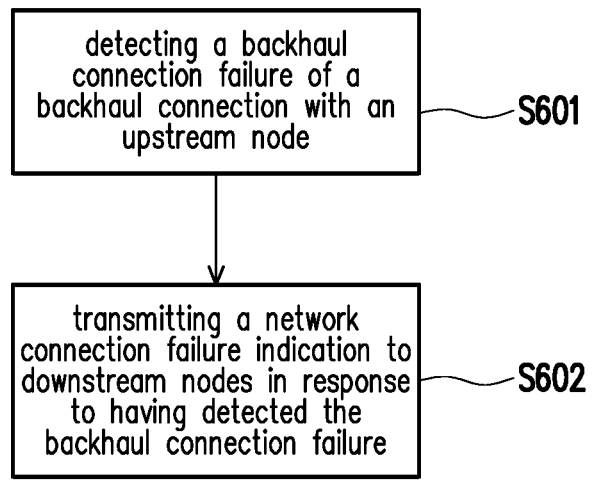
FIG. 6 illustrates from the perspective of a network access node in accordance with one of the exemplary embodiments of the disclosure.

FIG. 6 illustrates from the perspective of a network access node in accordance with one of the exemplary embodiments of the disclosure. In step S601, the network access node would detect a backhaul connection failure of a backhaul connection with an upstream node. In step S602, the network access node would transmit a network connection failure indication to downstream nodes in response to having detected the backhaul connection failure.

According to one of the exemplary embodiments, transmitting the network connection failure indication may involve transmitting the network connection failure indication via a DCI which is scrambled by a C-RNTI, a P-RNTI, or a SI-RNTI. In one or more of the subsequent embodiments, the DCI may have one or more bits. The DCI could be a DCI for PDCCH or PDSCH.

According to one of the exemplary embodiments, transmitting the network connection failure indication may involve transmitting the network connection failure indication via a MAC CE which may include a network connection failure indicator. The MAC CE may include a field of network connection failure indicator to indicate a network connection failure, and the MAC CE may further indicate a candidate target cell.

According to one of the exemplary embodiments, transmitting the network connection failure indication may involve transmitting the network connection failure indication via a MAC CE which may include a network connection failure indicator, and may further transmit a MAC CE which indicate a candidate target cell.

According to one of the exemplary embodiments, wherein transmitting the network connection failure indication may involve transmitting the network connection failure indication via a RRC message which is transmitted through a BCCH and indicating the network connection failure in a system information. The network connection failure could be indicated via a MIB with a value of cellBarred field be set as "barred", or the network connection failure could be indicated via a SIB1 when the scheduling information of SIB1 indicates a broadcasting status of a specific SIB as "broadcasting". Or the network connection failure could be indicated when SIB1 stopped transmitting, and the MIB may still be transmitting, or the network connection failure could be indicated when the UE has detected that the MIB has stopped transmitting.

According to one of the exemplary embodiments, the method may further involve receiving or determining a pre-configured handover configuration before a network connection failure indication has been received and the pre-configured handover configuration indicates a candidate target cell and storing information for processing a handover procedure based on the pre-configured handover configuration in response to detecting the backhaul connection failure and notifying downstream nodes that the remote access node is not in service in response to transmitting the network connection failure indication. Receiving or determining the pre-configured handover configuration may involve receiving the pre-configured handover configuration from a gNB-head/CU or from a core network and transmitting the pre-configured handover configuration to a UE. The pre-configured handover configuration further includes one of the following: a candidate target cell identity, a UE identity for connecting to the candidate target cell, a preamble for performing random access procedure to the candidate target cell, a time and frequency radio resource for performing random access procedure to the candidate target cell in response to having received a network connection failure indication.

According to one of the exemplary embodiments, detecting the backhaul connection failure may involve receiving a backhaul connection failure from a backhaul connection failure indicator of a physical layer such as a beam failure indicator.

According to one of the exemplary embodiments, the candidate target cell would be a PSCell if the UE is already connected to the PSCell so as to prioritize the connection to the PSCell.

Figure 7:
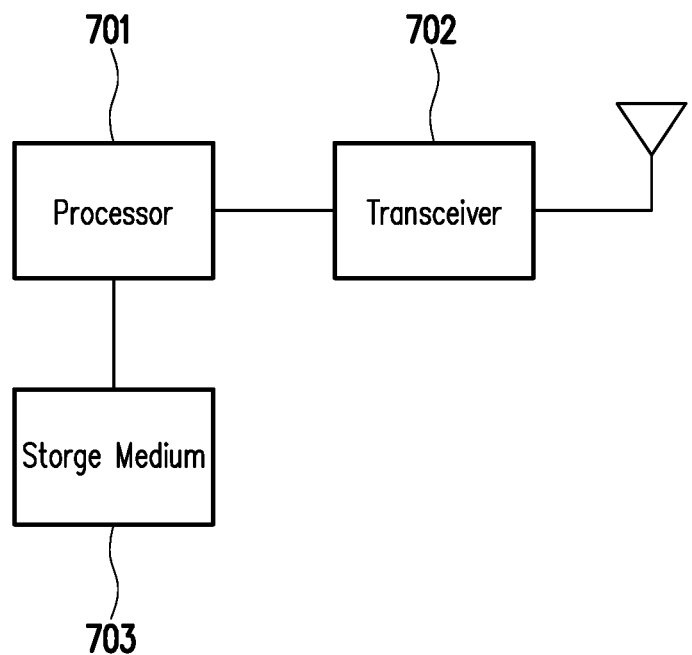
FIG. 7 illustrates the hardware block diagram of a network access node in accordance with one of the exemplary embodiments of the disclosure.

FIG. 7 illustrates the hardware block diagram of a network access node in accordance with one of the exemplary embodiments of the disclosure. The network access node could be a gNB-remote/DU as described in this disclosure, but the disclosure does not limit the network access node to a gNB-remote/DU of a 5G network but the concept of the network access node could be extended to any remote access node that is controlled by a base station of the RAN.

The exemplary network access node would include not limited to a processor 701 electrically connected to a transceiver 702 and a non-transitory storage medium 703 and configured to and configured at least for implementing the connection re-direction method used by a remote access node as well as its exemplary embodiments and alternative variations. The hardware transceiver 702 may include one or more transmitters and receivers configured to transmit and receive signals respectively in the radio frequency or in the mmWave frequency. The hardware transceiver 702 may also perform operations such as low noise amplifying, impedance matching, frequency mixing, up or down frequency conversion, filtering, amplifying, and so forth. The hardware transceiver 702 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 702 may further include an antenna array which may include one or multiple antennas to transmit and receive omni-directional antenna beams or directional antenna beams.

The hardware processor 701 is configured to process digital signals and to perform procedures of the proposed method of network slicing in accordance with the proposed exemplary embodiments of the disclosure. The hardware processor 701 could be implemented by using programmable units such as a micro-processor, a micro-controller, a DSP chips, FPGA, etc. The functions of the hardware processor 1301 may also be implemented with separate electronic devices or ICs. It should be noted that the functions of hardware processor 701 may be implemented with either hardware or software.

Figure 8:
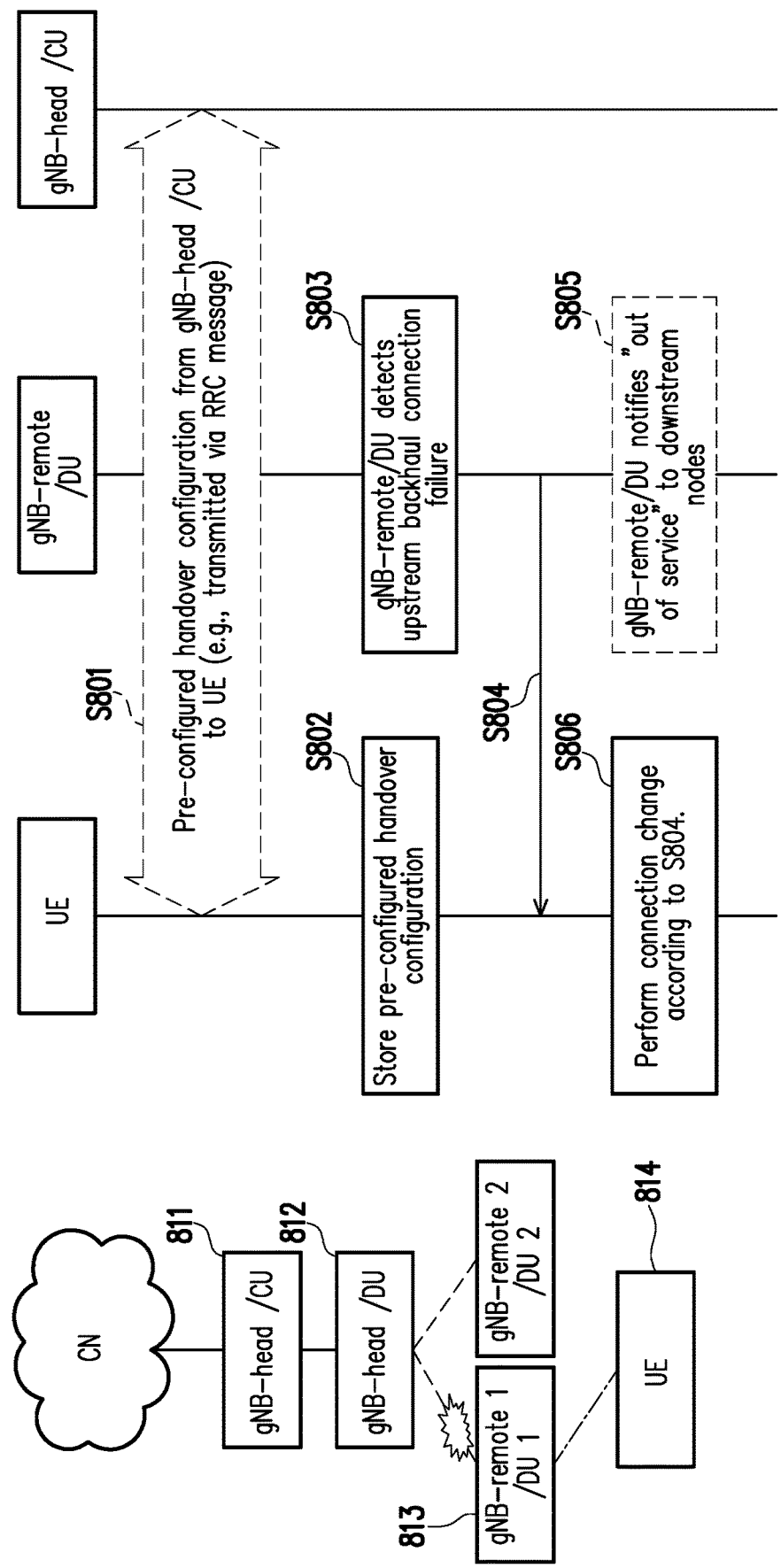
FIG. 8 illustrates a connection re-direction method according to a first exemplary embodiment of the disclosure.

FIG. 8 illustrates a connection re-direction method according to a first exemplary embodiment of the disclosure. Referring to FIG. 8, in step S801, the gNB-head/CU (e.g. 811) may transmit a pre-configured handover configuration to UE (e.g. 814), and the transmission may go through a gNB-head/DU (e.g. 812) and a gNB-remote/DU (e.g. gNB-remote 1/DU 813). The pre-configured handover configuration could be generated by the gNB-head/CU and sent to the UE or could be received from another node in the upstream such as from the core network or from a gNB-head/CU.

The pre-configured handover configuration may include at least one of: one or more candidate target cell(s) with each candidate target cell associated with a candidate target cell configuration including an associated identity that represent the candidate target cell, a UE ID, radio resource configuration information (e.g. carrier frequency, carrier bandwidth, indicator for whether to perform a random access procedure for a handover, timing alignment information, a part of SI, security information (e.g. security algorithm), and etc.). In step S802, the UE would store the received pre-configured handover configuration in a non-transitory storage medium (e.g. 503). The pre-configured handover configuration could be associated with a validity timer. In other words, the pre-configured handover configuration is considered valid for a predetermined time window which is tracked by the validity timer. After the expiration of the validity timer, the UE may not apply the pre-configured handover configuration to perform the subsequent handover as the pre-configured handover configuration is no longer considered valid.

In step S803, the gNB-remote/DU would determine whether a upstream backhaul connection failure along the gNB-head/CU and the gNB-remote/DU has occurred. The determination of the backhaul connection failure may base on, for example, a failure indication from the physical layer such as the beam failure indication. In step S804, the gNB-remote/DU would transmit a network connection failure indication to the downstream nodes (including attached UEs and attached gNB-remote/DUs) in response to having determined that the backhaul connection failure has occurred. The network connection failure indication is for the gNB-remote/DU to notify its downstream nodes that the cell is not for service (e.g. cell barred, not allowed for camping nor access). However, if the gNB-remote/DU does not currently serve as the PCell of the UE, the gNB-remote/DU might not transmit the network connection failure indication to the downstream nodes.

In step S804, the downstream node UE 814 would perform a handover procedure in response to receiving the network connection failure indication from the serving gNB-remote/DU, wherein the UE may be any one of the downstream node served by the first gNB-remote/DU. UE may then apply the pre-configured handover configuration to perform the handover procedure in order to be handed over to a candidate target cell (e.g. eNB-remote 2/DU 2) assuming that the pre-configured handover configuration is valid. The UE 814 may release the connection with the previous gNB-remote/DU (e.g. gNB-remote 1/DU 1 813) when the handover procedure has been successful. Instead of connecting to the candidate target cell, the UE however may perform a connection re-establishment procedure if the pre-configured handover configuration is invalid. UE would not attempt to resume or select the previous gNB-remote/DU (e.g. gNB-remote 1/DU 1 813) when a failure of the handover procedure is detected. In step S806, the gNB-remote/DU may notify all its downstream nodes that cells are out of service.

For step S804, the gNB-remote/DU transmitting a network connection failure indication to the UE may involve transmitting the network connection failure indication which includes information to indicate to the UE that a cell could no longer be used for service (e.g., cell barred, not allowed for camping nor access) in response to the gNB-remote/DU having determined that a backhaul connection failure has occurred. The network connection failure indication which indicates that a cell is not for service could be transmitted via various means such as a broadcast message (e.g. MIB, SIB1, system information message) through which one bit in DCI with cyclic redundant check (CRC) scrambled by system information-radio network temporary identifier (SI-RNTI) to indicate that the cell is not for service. The cellBarred information element (IE) within the MIB could be set as 'barred'. The intraFreqReselection IE within MIB could be set as as "allowed". The transmission of SIB1 could be stopped while the transmission of MIB is occurring.

The gNB-remote/DU may transmit the network connection failure indication to the UE to indicate that a cell is not for service by using a group-based notification such as a paging message. The group-based notification could be transmitted by means of one bit or an indicator in DCI with CRC scrambled by P-RNTI to indicate cell not for service. An indicator (e.g., a 2 bits indicator) in DCI with CRC scrambled by paging-RNTI (P-RNTI) could be used to indicate that a short message is present in the DCI, and there is a value in the short message of the same DCI to indicate that the cell is not for service. The gNB-remote/DU may maintain UE context which may include any one or more of the UEs to which the gNB-remote/DU served as a PCell, the DRX cycle information of the UEs served by the gNB-remote/DU, the RRC state of UE, and the information of the candidate target cells.

Alternatively, for step S804, the notification of network connection failure could be transmitted via a MAC CE, a DCI, a RRC message (via a broadcast control channel (BCCH)). If a MAC CE is to be used to notify the failure of network connection, one field of the MAC CE could be used to indicate the RAN network connection failure. The MAC CE may further include an indication of the target cell, or another MAC CE may further be transmitted to include an indication of the target cell. For example, the indication of the target cell could be using between 2~31 bits to indicate the identity associated with the candidate target cell. The identity associated with the candidate target cell could be configured via a downstream node specific RRC message before the occurrence of the network connection failure. Each candidate target cell would be associated with an identity which is unique for each gNB-remote. The indication of the target cell could be a bitmap used to indicate multiple candidate target cells except the cell provided by the serving gNB-remote/DU. The indicated target cell may include an active PSCell or SCell. The indicated target cell could be a cell provided by a gNB-remote/DU which is different from the current serving gNB-remote/DU. The indicated target cell could be a cell associated with a gNB-head/CU which is different from the current serving gNB-head/CU.

The gNB-remote/DU may maintain the UE context which may include any one or more of the UEs to which the gNB-remote/DU served as a PCell, the DRX cycle information of the UEs served by the gNB-remote/DU, the RRC state of UE, and the information of the candidate target cells.

If the DCI is to be used to notify the failure of network connection, the failure of network connection to be transmitted via DCI may be used for a downstream node specific notification, a group-specific notification, or a cell-specific notification. The format of the notification would be one of three ways.

First, the DCI could be scrambled by cell-RNTI (C-RNTI) which is for a downstream node specific notification. The DCI may contain 1 indicator (e.g., a one-information-bit indicator) to indicate the failure of network connection. The DCI could be a DCI for physical downlink control channel (PDCCH) or physical downlink shared channel (PDSCH).

Second, the DCI could be scrambled by P-RNTI which is for a group-specific notification. An indicator (e.g., a 1-information-bit indicator) of the DCI could be used to indicate the failure of network connection or an indicator (e.g., a 2-information-bit indicator) of the DCI could be used to indicate a Short Message information with a specific value in the Short Message to indicate network connection failure or an indicator (e.g., a 1-information-bit indicator) of the DCI could be used to indicate SI modification notification and to include the indication of network connection failure in the system information.

Third, the DCI could be scrambled by SI-RNTI for a cell specific notification. An indicator (e.g, a 1-information-bit indicator) of the DCI could be used to indicate the failure of network connection or one specific SIB could be used to carry the information of network connection failure such as to indicate network connection failure when the scheduling information in SIB1 indicating that a specific SIB is broadcasting.

The gNB-remote/DU may maintain UE context which may include any one or more of the UEs to which the gNB-remote/DU served as a PCell, the DRX cycle information of the UEs served by the gNB-remote/DU, the RRC state of UE, and the information of the candidate target cells.

If an RRC message is to be used to notify the failure of network connection, the RRC message could be transmitted via a BCCH. One specific SIB could be used to carry the information of network connection failure such as to indicate network connection failure when the scheduling information in SIB1 indicate the specific SIB is broadcasting. The network connection failure indication could be included in a specific SIB which may include information to assist UE to determine a target cell. Such information may include S-criteria values for determining the target cell, a white list of cell identity which suggests what cell(s) could be used as a potential target cell, and/or a black list of cell identity which suggests what cell(s) should not be used as a potential target cell.

In step S806, a UE may perform connection change in response to the notification of network connection failure received from the serving gNB-remote/DU in at least four ways. First, if the gNB-head/CU has configured a target cell for a UE, the UE may handover to the target cell in response to receiving the notification of network connection failure from the gNB-remote/DU. If the target cell is not the PSCell or the PUCCH SCell before UE having received the network connection failure notification, then UE perform a random-access procedure when the connection is changed to the target cell. Alternatively, if the gNB-head/CU has provided a target cell for the UE, and the gNB-remote/DU has indicated the target cell, then the UE may change its connection to the target cell indicated by the network connection failure notification upon receiving the notification of network connection failure from gNB-remote/DU.

Second, if the gNB-head/CU did not configure a target cell for the UE and the gNB-remote/DU has indicated the target cell, then the UE may change its connection to the target cell indicated by the network connection failure notification in response to receiving the notification of network connection failure from the gNB-remote/DU. If the target cell is not the PSCell or the PUCCH SCell before the UE has received the network connection failure notification, UE may perform a random-access procedure when changing its connection to the target cell.

Third, if the gNB-head/CU did not configure target cell for UE and the gNB-remote/DU did not indicate the target cell, then UE may initiate a cell reselection procedure in response to receiving the notification of network connection failure from gNB-remote/DU. If the target cell is not the PSCell or the PUCCH SCell before UE received the network connection failure notification, then UE may perform a random-access procedure when changing connection to the target cell.

Fourth, if the gNB-head/CU did not configure target cell for the UE and the gNB-remote/DU did not indicate the target cell for the UE, then the UE may initiate a connection re-establishment procedure upon receiving the notification of network connection failure from the gNB-remote/DU. If the target cell is not the PSCell or the PUCCH SCell before the UE has received the network connection failure notification, then the UE perform a random-access procedure when changing connection to the target cell.

Figure 9:
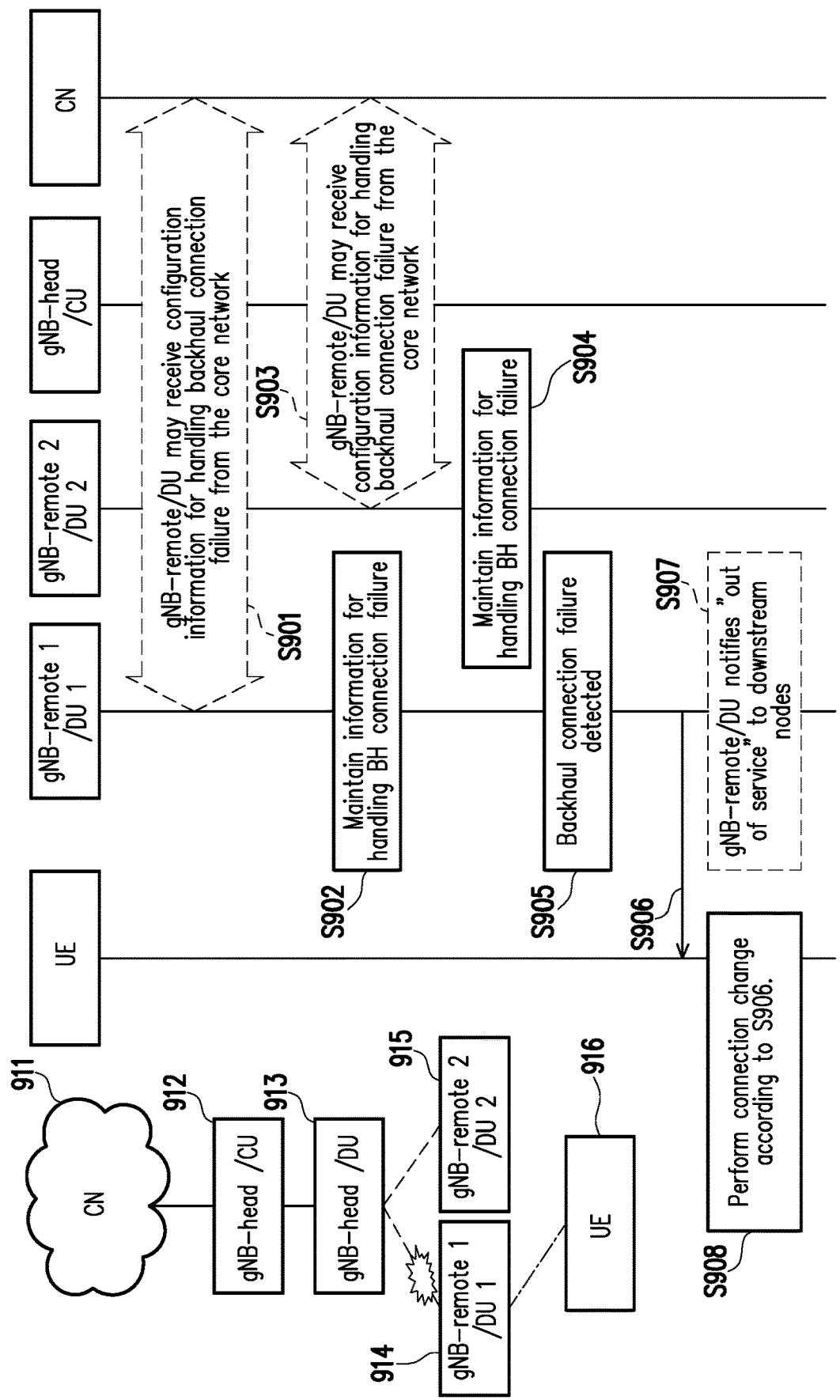
FIG. 9 illustrates a connection re-direction method according to a second exemplary embodiment of the disclosure.

FIG. 9 illustrates a connection re-direction method according to a second exemplary embodiment of the disclosure. Referring to FIG. 9, in step S901, a first gNB-remote/DU (e.g. gNB-remote 1/DU 1 914) may receive a configuration information for processing a backhaul connection failure from the core network (e.g. 911). The configuration information could be transmitted through a gNB-head/CU (e.g. 912) and gNB-head/DU (e.g. 913) before reaching the first gNB-remote/DU. In step S902, the first gNB-remote/DU would maintain the configuration information for processing a backhaul connection failure by maintaining information of at least one candidate target cell. The information of at least one candidate target cell could be a cell-specific configuration. The first gNB-remote/DU may obtain the information of at least one candidate target cell according to, for example, the information from the gNB-head/CU which could be information related to a gNB-remote/DU specific configuration, a cell specific configuration, or a UE-specific configuration, wherein the UE may be any one of the downstream node served by the first gNB-remote/DU. The gNB-remote/DU may also obtain such information of at least one candidate target cell by exchanging information with a second gNB-remote/DU (e.g. gNB-remote 2/DU 2 915) or another gNB-remote/DU, and the information of at least one candidate target cell could be a gNB-remote/DU specific configuration or a cell specific configuration or a UE-specific configuration.

In step S903, the second gNB-remote/DU (e.g., gNB-remote 2/DU 2 915) may also obtain, through a gNB-head/CU 912, the information of at least one candidate target cell which is included in the (pre-configured) handover configuration from the core network (e.g. 911) (e.g. CN/OAM). Such information could also be a gNB-remote/DU specific configuration or a cell specific configuration. In step S904, the second gNB-remote/DU may also maintain the configuration information for processing a backhaul connection failure.

For the configuration information received in step S901, there could be a validity timer for the information of at least one candidate target cell. Once the validity timer has expired, the information of at least one candidate target cell is no longer current and thus no longer valid. The validity timer could be implemented in a per-configured target cell basis, and each validity timer of the per-configured target cell could be implemented for each UE or a list of UEs. The validity timer could be associated with one configuration information set for one UE or a list of UEs.

In step S905, the first gNB-remote/DU would determine whether a upstream backhaul connection failure has occurred. Such determination could be based on, for example, a failure indication from a physical layer such as a beam failure indication. In step S906, the first gNB-remote/DU would transmit a network connection failure indication which notifies downstream nodes (including attached UEs and attached gNB-remote/DUs) that the cell is no longer for service (e.g. cell barred, not allowed for camping nor access) in response to a backhaul connection failure having been determined by the first gNB-remote/DU. The network connection failure indication could be transmitted to a downstream node through a broadcast message such as system information, a group-based notification such as paging message, a downstream node specific notification such as through a MAC CE, and etc. From the information within the network connection failure indication, the first gNB-remote/DU would be able to notify to a downstream node that a network connection failure has occurred, but if the first gNB-remote/DU does not serve as the PCell of a downstream node, then the first gNB-remote/DU may not send network connection failure indication to the downstream node. In step S907, after transmitting the network connection failure indication, the first gNB-remote/DU would notify other downstream nodes that the cell is no longer for service.

In step S908, after receiving the network connection failure indication from the first gNB-remote/DU, the downstream node would perform a connection change. The downstream node may apply an indication provided in the network connection failure indication to perform a handover procedure to change its connection from the first gNB-remote/DU to a candidate target cell (e.g. second gNB-remote/DU) assuming that the configuration for the UE to change to the candidate target cell remains valid. Once the handover process has been successful, the downstream node would release its connection with the serving gNB-remote/DU which is the first gNB-remote/DU to the candidate target cell (e.g. second gNB-remote/DU). If the handover process is not successful, then the downstream node would not attempt to resume or select the source cell which is associated with the first gNB-remote/DU. However, if the configuration for the downstream node to change to the candidate target cell is no longer valid, then the downstream node may instead perform a connection re-establishment procedure and may further avoid selecting the current serving cell (e.g., consider the current serving cell as one of the blacklist cell).

In step S902, the first gNB-remote/DU would maintain the information of at least one candidate target cell which could be a cell-specific configuration. The first gNB-remote/DU may obtain the information of at least one candidate target cell according to, for example, the information from the gNB-head/CU which could be a gNB-remote/DU specific configuration or a cell specific configuration or a UE-specific configuration. The information of at least one candidate target cell could be obtained from a second gNB-remote/DU (e.g. gNB-remote 2/DU 2 915) or another gNB-remote/DU. Such information could be a gNB-remote/DU specific configuration or a cell specific configuration. The information of at least one candidate target cell could also be a pre-configuration obtained from the core network (e.g. operations, administration, and maintenance (OAM)), and the information of at least one candidate target cell could be a gNB-remote/DU specific configuration or a cell specific configuration.

There could be a validity timer for the information of at least one candidate target cell. Once the validity timer has expired, the information of at least one candidate target cell is no longer current and thus no longer valid. The validity timer could be implemented in a per-configured target cell basis, and each validity timer of the per-configured target cell could be implemented for each downstream node or a list of downstream nodes. The validity timer could be associated with one configuration information set for one downstream node or a list of downstream nodes.

The information of at least one candidate target cell may include, for example, cell identity associated with the candidate target cell, carrier frequency of the candidate target cell, traffic load information, synchronization information, subcarrier space of the candidate target cell, and etc. The cell identity could be, for example, a physical cell ID (PCI), a new radio (NR) cell global ID (NCGI), an intra-cell identity which is unique for the cell. The mapping of the intra-cell identity and the physical cell ID is configured from a gNB to a UE before the occurrence of network connection failure. The synchronization information could be, for example, SSB measurement timing configuration (SMTC), synchronization timing offset, and etc.

In steps S902 and S904, the first and the second gNB-remote/DU may maintain UE context including, for example, the UEs to which the gNB-remote/DU served as a PCell, the DRX cycle information of the UEs served by the gNB-remote/DU, the RRC state of UE, the information of the candidate target cells, and etc. The first gNB-remote/DU may notify to UEs that the cell is not for service (e.g. cell barred, not allowed for camping nor access) upon having determined by the first gNB-remote/DU that a backhaul connection failure has occurred. The determination of the backhaul connection failure could be based on a failure indication from a physical layer such as a beam failure indication. The notification of a cell is not for service may be transmitted via a broadcast message such as SI and a group-based notification such as a paging message.

The broadcast message through a SI broadcast could be implemented by using an indicator (e.g., a 1-information-bit indicator) in DCI with CRC scrambled by SI-RNTI to indicate that a cell not for service. The cellBarred information element (IE) of MIB could be set as "barred" and the intraFreqReselection IE of MIB could be set as "allowed". Also, the transmission of SIB1 could be stopped while the transmission of MIB is still occurring.

The group based notification such as through a paging message could be implemented by means including using one bit or an indicator in DCI with CRC scrambled by P-RNTI to indicate that the cell is not for service, using an indicator in DCI with CRC scrambled by P-RNTI to indicate that there is a short message present in the DCI, and the short message contains a specific value which indicates that the cell is not for service. Also in step S904 and S904, the first and the second gNB-remote/DU may maintain a UE context including the UEs to which the gNB-remote/DU served as a PCell, the DRX cycle information of the UEs served by the gNB-remote/DU, the RRC state of UE, and the information of the candidate target cells.

In step S906, the network connection failure indication could be transmitted by means including MAC CE, DCI, and RRC message transmitted via BCCH. In detail, the network connection failure indication could be transmitted by using one field within a MAC CE to notify that a network connection failure has occurred. The MAC CE may also include the indication to convey information about the candidate target cell, or another MAC CE may further be transmitted to include an indication of the target cell. For instance, the MAC CE may include 2~31 bits to indicate the identity associated with the candidate target cell. The identity associated with the candidate target cell may be configured via a downstream node specific RRC message before the occurrence of the network connection failure as each candidate target cell is associated with an identity which is unique for each the gNB. The indication within the MAC CE could be a bitmap to indicate multiple candidate target cells except for the cell provided by the serving gNB-remote/DU. The indicated candidate target cell may include an active PSCell or SCell. The indicated candidate target cell could be a cell provided by a gNB-remote/DU and is different from the serving gNB-remote/DU. The indicated target cell could be a cell associated with a gNB-head/CU which is different from the serving gNB-head/CU. The first gNB-remote/DU may maintain UE context including the UEs to which the gNB-remote/DU served as a PCell, the DRX cycle information of the UEs served by the gNB-remote/DU, the RRC state of UE, and the information of the candidate target cells.

The network connection failure indication could be transmitted by using a DCI. The first gNB-remote/DU may maintain the UE context including the UEs to which the gNB-remote/DU served as a PCell, the DRX cycle information of the UEs served by the gNB-remote/DU, the RRC state of UE, and the information of the candidate target cells. The DCI may indicate information of a candidate target cell by including, for example, the identity associated with the candidate target cell which may be configured via a UE/downstream node specific RRC message before the occurrence of the network connection failure as each candidate target cell is associated with an identity which is unique for each gNB-remote. The DCI may indicate information of the candidate target cell by using, for example, a bitmap to indicate multiple candidate target cells except for the cell provided by the serving gNB-remote/DU, the identity of a candidate target cell which may include an active PSCell or SCell, the candidate target cell which may include a cell provided by a gNB-remote/DU which is different from the serving gNB-remote/DU, or the candidate target cell which may include a cell associated with a gNB-head/CU which is different from the serving gNB-head/CU.

The notification transmitted via a DCI may be used for a UE/downstream node specific notification, a group-specific notification, or a cell-specific notification. The formation of the notification format may adopt one of following cases. First, the DCI could be scrambled by C-RNTI for the downstream node specific notification. An indicator in the DCI could be used to indicate the failure of network connection. The DCI may include 1~5 information bits to indicate a candidate target cell. The DCI could be a DCI for PDCCH or PDSCH.

Second, DCI could be scrambled by a P-RNTI for the group-specific notification. The DCI may include an indicator (e.g., a 2 bits indicator) to indicate the presence of a Short Message information, and there is a value in the short message of the DCI to indicate the failure of RAN connection, and may further include an indicator of the DCI to indicate the candidate target cell. Or an indicator (e.g, a 1-information-bit indicator) of the DCI could be used to indicate SI modification notification and to include the indication of network connection failure in the system information.

Third, the DCI could be scrambled by using SI-RNTI. An indicator (e.g, a 1-information-bit indicator) of the DCI could be used to indicate the failure of network connection, and the DCI may further include an indicator to indicate a candidate target cell ID. Or one specific SIB could be used to carry the information of network connection failure such as to indicate network connection failure when the scheduling information in SIB1 indicating that a specific SIB is broadcasting, the specific SIB may further include the information of candidate target cell ID.

The network connection failure indication could be transmitted by using a RRC message which could be transmitted via a BCCH. One specific SIB could be used to carry the information of network connection failure. The network connection failure could be indicated when the scheduling information in SIB1 indicates that the specific SIB is broadcasting. The network connection failure could be indicated in the specific SIB which may include information to assist UE to determine a target cell such as S-criteria values for determining the target cell, a white list of cell identity which suggests the UE to use a cell listed in the white list as a target cell, and/or a black list of cell identity which suggests the UE to not use as a target cell.

In step S908, the UE/downstream may perform a connection change in response to receiving the notification of network connection failure from the serving gNB-remote/DU. The connection change could be processed in one of the four manners. First, if the gNB-head/CU has configured a target cell for the UE, then the UE may a handover to the target cell in response to receiving the notification of network connection failure from gNB-remote/DU. If the target cell is not the PSCell or PUCCH SCell before the UE has received the network connection failure notification, then the UE perform a random-access procedure when changing connection to the target cell. If gNB-head/CU does provide a target cell for the UE and the information of the target cell is valid and the first gNB-remote/DU indicates the target cell, then the UE may change connection to the target cell as indicated by the network connection failure notification in response to receiving the notification of network connection failure from gNB-remote/DU.

Second, if the gNB-head/CU did not configure target cell for the UE and the first gNB-remote/DU does indicates the target cell, then the UE may change connection to the target cell as indicated by the network connection failure notification in response to receiving the notification of network connection failure from the first gNB-remote/DU. If the target cell is not the PSCell or PUCCH SCell before the UE has received the network connection failure notification, then the UE perform a random-access procedure when changing connection to the target cell.

Third, if the gNB-head/CU did not configure target cell for the UE and the first gNB-remote/DU did not indicate the target cell, then UE may initiate a connection re-establishment procedure in response to receiving the notification of network connection failure from first gNB-remote/DU, and may further avoid selecting the current serving cell (e.g., consider the current serving cell as one of the blacklist cell). If the target cell is not the PSCell or PUCCH SCell before the UE has received the network connection failure notification, then UE perform a random-access procedure when changing connection to the target cell.

Fourth, if the gNB-head/CU did not configure target cell for the UE/downstream and the first gNB-remote/DU also did not indicate the target cell, then UE/downstream may initiate a connection re-establishment procedure upon receiving the notification of network connection failure from the first gNB-remote/DU. If the target cell is not the PSCell or PUCCH SCell before the UE/downstream has received the network connection failure notification, then UE perform a random-access procedure when changing connection to the target cell. If the first gNB-remote/DU does not serve as the PCell of the UE/downstream, then the first gNB-remote/DU may not send a network connection failure indication to the UE/downstream.

Figure 10:
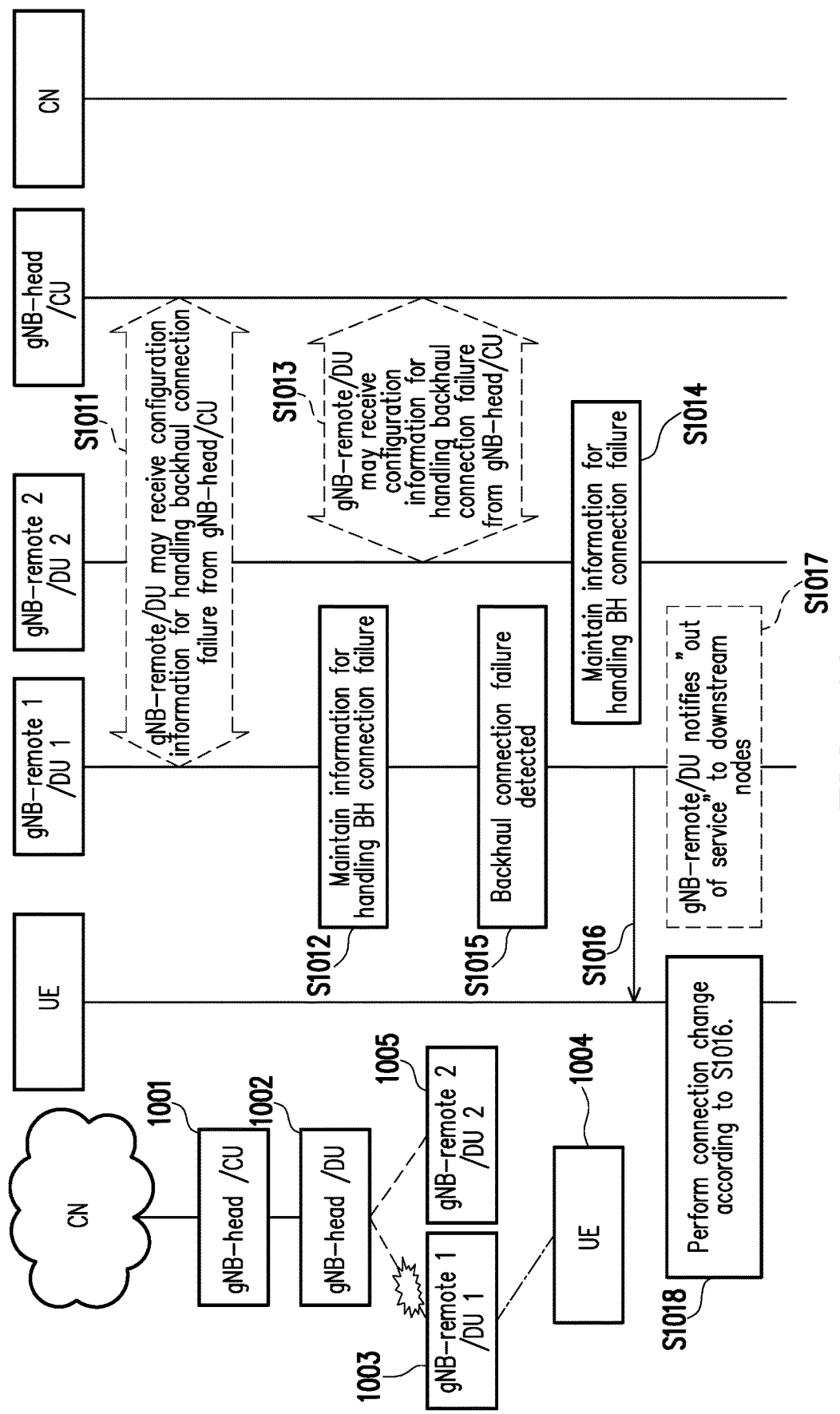
FIG. 10 illustrates a connection re-direction method according to a third exemplary embodiment of the disclosure.

FIG. 10 illustrates a connection re-direction method according to a third exemplary embodiment of the disclosure. In step S1011, a first gNB-remote/DU (e.g. gNB-remote/DU 1 1003) would receive a configuration information for processing a backhaul connection failure from a gNB-head/CU (e.g. 1001) through a gNB-head/DU (e.g. 1002). In step S1012, the first gNB-remote/DU would also maintain the received configuration information for handling a potential backhaul connection failure. In step S1013, a second gNB-remote (e.g. gNB-remote/DU 1 1005) would also receive the configuration information for processing a backhaul connection failure from a gNB-head/CU. In step S1014, the second gNB-remote/DU would maintain the received configuration information for processing a backhaul connection failure. In step S1015, the first gNB-remote/DU would determine whether a backhaul connection failure has occurred. In step S1016, in response to having determined that a backhaul connection failure has occurred, the first gNB-remote/DU to transmit a network connection failure indication to a UE (e.g. 1004) which is attached to the first first gNB-remote/DU, wherein the UE could be any downstream node of the first gNB-remote/DU. In step S1017, the first gNB-remote/DU would notify its downstream nodes that the cell associated with the first gNB-remote/DU is not for service. In step S1018, the UE would perform a connection change according to information received from the network connection failure indication.

The main difference between the third exemplary embodiment and the second exemplary embodiment is that the configuration information does not originate from a core network but is instead originates from a gNB-head/CU (e.g. 1001). It should apparent to skilled artisan that the details regarding steps S1012~S1018 are the same or very similar to steps S902~S908 and thus the same description is not to be repeated.

Figure 11:
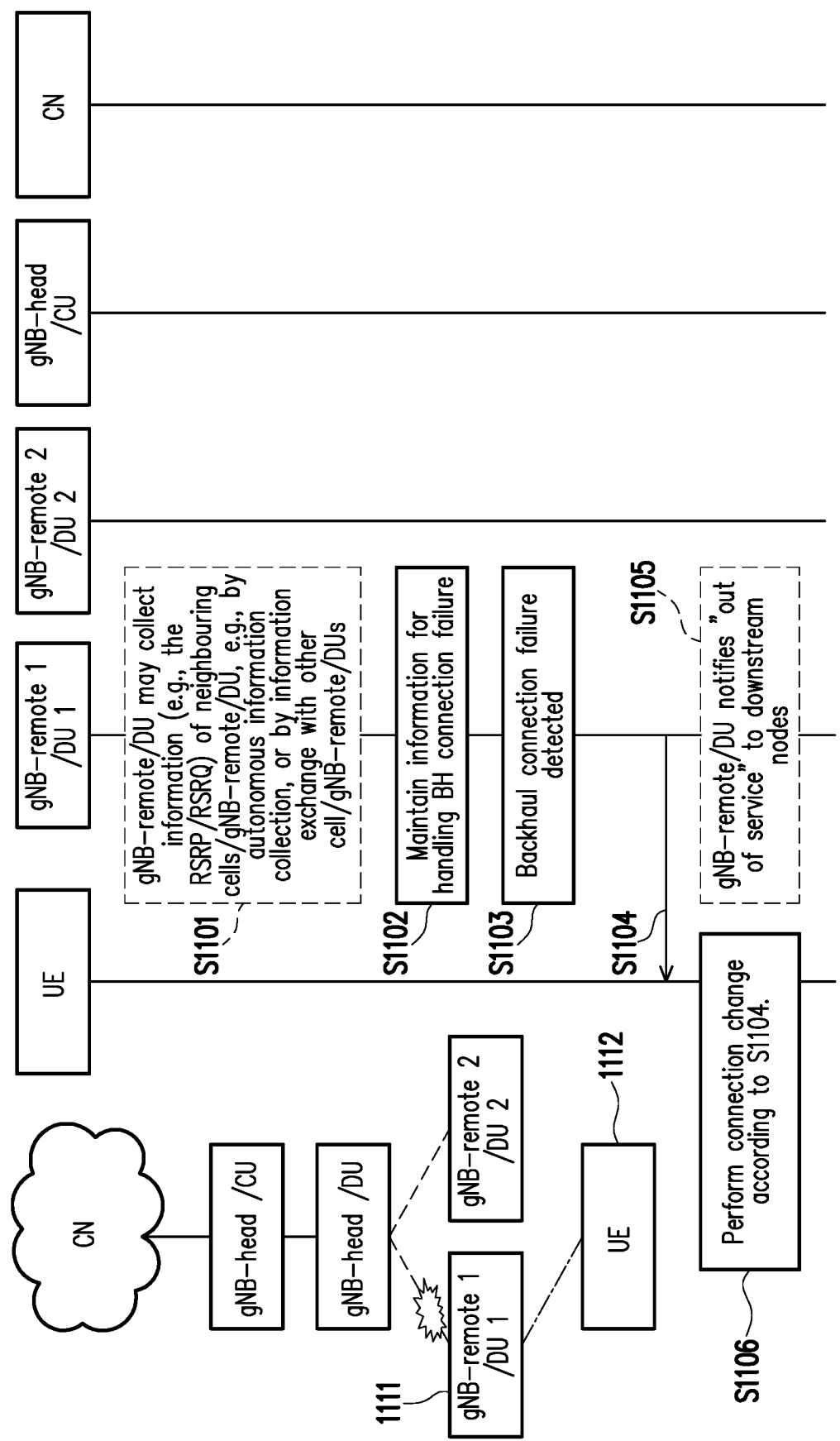
FIG. 11 illustrates a connection re-direction method according to a fourth exemplary embodiment of the disclosure.

FIG. 11 illustrates a connection re-direction method according to a fourth exemplary embodiment of the disclosure. In step S1101, the gNB-remote/DU (e.g. eNB-remote 1/DU 1 1111) may collect information such as reference signal received power (RSRP) or reference signal received quality (RSRQ) from a neighboring gNB-remote/DU (e.g. gNB-remote 2/DU 2) or may obtain such information from another cell or by exchanging information with a neighboring gNB-remote/DU (e.g. gNB-remote 2/DU 2) in order that the gNB-remote/DU would autonomously determine its own configuration information for handling a potential backhaul connection failure.

In step S1102, the gNB-remote/DU would maintain its own configuration information for handling a potential backhaul connection failure. In step S1103, the gNB-remote/DU would determine whether a backhaul connection failure has occurred. In step S1104, the gNB-remote/DU would transmit a connection failure indication to a UE (e.g. 1112) that is attached to the gNB-remote/DU in response to having determined that the backhaul connection failure has occurred. In step S1105, the gNB-remote/DU would notify its downstream nodes that the cell associated with the first gNB-remote/DU is not for service. In step S1106, the UE would perform a connection change according to information received from the network connection failure indication.

The main difference between the fourth exemplary embodiment and previous exemplary embodiments is that a gNB-remote/DU (e.g. gNB-remote 1/DU 1 1111) may autonomously determine the configuration information by performing active measurements or by obtaining data from its neighboring nodes. It should apparent to skilled artisan that the details regarding steps S1102~S1106 are the same or very similar to steps of previous exemplary embodiments and thus the same information is not to be repeated.

In view of the aforementioned descriptions, the disclosure is suitable for being used in a 5G communication system and beyond or a similar communication system by providing a connection re-direction mechanism so that a UE would be able to determine a backhaul connection failure and perform a handover process in response to receiving a network connection failure indication without excessive signaling and reconfigurations.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A connection re-direction method used by a UE, the method comprising:
    receiving a network connection failure indication;
    performing a connection change procedure; and
    receiving a pre-configured handover configuration only before receiving the network connection failure indication, the pre-configured handover configuration comprising a candidate target cell, and performing a handover procedure based on the pre-configured handover configuration further comprising connecting to the candidate target cell in response to having received the network connection failure indication,
    wherein receiving the network connection failure indication comprising:
        receiving the network connection failure indication via downlink signaling.

2. The method of claim 1, wherein the connection change procedure is a mobility procedure, wherein the mobility procedure is the handover procedure or a connection re-establishment procedure.

3. The method of claim 1, wherein performing the connection change procedure comprising performing the connection change procedure based on information carried in the network connection failure indication.

4. The method of claim 1, if a UE have received the pre-configured handover configuration before the network connection failure indication has been received and the pre-configured handover configuration is valid, claim 1 further comprising:
    performing the handover procedure as the connection change procedure based on the pre-configured handover configuration in response to having received the network connection failure indication.

5. The method of claim 1, wherein receiving the network connection failure indication comprising:
    receiving the network connection failure indication via a downlink control information (DCI) which is scrambled by a cell-radio network temporary identifier (C-RNTI).

6. The method of claim 1, wherein receiving the network connection failure indication comprising:
  receiving the network connection failure indication via a downlink control information (DCI) which is scrambled by a paging-radio network temporary identifier (P-RNTI).

7. The method of claim 1, wherein receiving the network connection failure indication comprising:
  receiving the network connection failure indication via a specific value carried by a short message information in a DCI which is scrambled by a P-RNTI.

8. The method of claim 1, wherein receiving the network connection failure indication comprising:
  receiving the network connection failure indication via a downlink control information (DCI) which is scrambled by a system information-radio network temporary identifier (SI-RNTI).

9. The method of claim 1, wherein receiving the network connection failure indication comprising:
  receiving the network connection failure indication via a media access control information element (MAC CE) which comprises a radio access network (RAN) failure indicator.

10. The method of claim 9, wherein the MAC CE comprising a field of a network connection failure indicator to indicate the network connection failure.

11. The method of claim 9, wherein the MAC CE further comprising an indication of a candidate target cell.

12. The method of claim 1, wherein receiving the network connection failure indication comprising:
  receiving the network connection failure indication via a radio resource control (RRC) message which is transmitted through a broadcast control channel (BCCH); and
  indicating the network connection failure in a system information.

13. The method of claim 12, wherein the network connection failure is indicated via a master information block (MIB) with a value of cellBarred field set as "barred".

14. The method of claim 12, wherein the network connection failure is indicated via a system information block 1 (SIB1) when the scheduling information of SIB1 indicates a broadcasting status of a specific SIB as "broadcasting".

15. The method of claim 12, wherein the network connection failure is indicated when having detected that a SIB1 stopped transmitting and a MIB is still transmitting.

16. The method of claim 12, wherein the network connection failure is indicated when having detected that a MIB stopped transmitting.

17. The method of claim 4, wherein the pre-configured handover configuration is associated with a predetermined time limit, and performing the handover procedure based on the pre-configured handover configuration further comprising connecting to the candidate target cell in response to the pre-configured handover configuration being within the predetermined time limit.

18. The method of claim 17, wherein the pre-configured handover configuration further comprising one of the following:
  a candidate target cell identity, a UE identity for connecting to the candidate target cell, a preamble for performing random access procedure to the candidate target cell, a time and frequency radio resource for performing random access procedure to the candidate target cell in response to the pre-configured handover configuration.

19. The method of claim 17 further comprising stop performing the handover procedure based on the pre-configured handover configuration upon an expiration of the predetermined time limit.

20. The method of claim 1, wherein connecting to the candidate target cell further comprising:
  performing a random access procedure if the candidate target cell is not a primary secondary cell (PSCell) or a PUCCH SCell.

21. The method of claim 1, wherein performing the connection change procedure further comprising:
  performing a connection re-establishment procedure in response to not having a valid pre-configured handover configuration.

22. A connection re-direction method used by a remote access node, the method comprising:
  detecting a backhaul connection failure of a backhaul connection in an upstream node;
  transmitting a network connection failure indication in response to having detected the backhaul connection failure; and
  receiving or determining a pre-configured handover configuration which indicates a candidate target cell only before detecting the backhaul connection failure of a backhaul connection in an upstream node,
  wherein transmitting the network connection failure indication in response to having detected the backhaul connection failure comprising:
  transmitting the network connection failure indication via downlink signaling.

23. The method of claim 22, wherein transmitting the network connection failure indication comprising:
  transmitting the network connection failure indication via a downlink control information (DCI) which is scrambled by a cell-radio network temporary identifier (C-RNTI).

24. The method of claim 22, wherein transmitting the network connection failure indication comprising:
  transmitting the network connection failure indication via a downlink control information (DCI) which is scrambled by a paging-radio network temporary identifier (P-RNTI).

25. The method of claim 24, wherein transmitting the network connection failure indication comprising:
  transmitting the network connection failure indication via a specific value carried by a short message information in a DCI which is scrambled by a P-RNTI.

26. The method of claim 22, wherein transmitting the network connection failure indication comprising:
  transmitting the network connection failure indication via a downlink control information (DCI) which is scrambled by a system information-radio network temporary identifier (SI-RNTI).

27. The method of claim 22, wherein transmitting the network connection failure indication comprising:
  transmitting the network connection failure indication via a media access control information element (MAC CE) which comprises a radio access network (RAN) failure indicator.

28. The method of claim 27, wherein the MAC CE comprising a field of a network connection failure indicator to indicate the network connection failure.

29. The method of claim 22 further comprising:
  processing a handover procedure based on the pre-configured handover configuration in response to detecting the backhaul connection failure; and notifying downstream nodes that the remote access node is not in service in response to transmitting the network connection failure indication.

30. The method of claim 22, wherein transmitting the network connection failure indication comprising:
   transmitting the network connection failure indication via a radio resource control (RRC) message which is transmitted through a broadcast control channel (BCCH); and
   indicating the network connection failure in a system information.

31. The method of claim 30, wherein the network connection failure is indicated via a master information block (MIB) with a value of cellBarred field set as "barred".

32. The method of claim 30, wherein the network connection failure is indicated via a system information block 1 (SIB1) when the scheduling information of the SIB1 indicates a broadcasting status of a specific SIB as "broadcasting".

33. The method of claim 30, wherein the network connection failure is indicated when having detected that a SIB1 stopped transmitting and a MIB is transmitting.

34. The method of claim 30, wherein the network connection failure is indicated when having detected a MIB stopped transmitting.

35. The method of claim 22, wherein the MAC CE comprising a field to indicate a candidate target cell.

36. The method of claim 35, wherein the pre-configured handover configuration further comprising one of the following:
   a candidate target cell identity, a UE identity for connecting to the candidate target cell, a preamble for performing random access procedure to the candidate target cell, a time and frequency radio resource for performing random access procedure to the candidate target cell in response to the pre-configured handover configuration.

37. The method of claim 35, wherein receiving or determining the pre-configured handover configuration comprising:
   receiving the pre-configured handover configuration from a gNB-head central unit (CU) or from a core network.

38. The method of claim 22, wherein detecting the backhaul connection failure comprising:
   receiving a backhaul connection failure indicator of a physical layer.

39. The method of claim 29, wherein the candidate target cell is determined as a primary secondary cell (PSCell) or a PUCCH SCell in response to the UE having already connected to the PSCell or the PUCCH SCell.

40. A user equipment (UE) comprising:
   a receiver; and
   a processor coupled to the receiver and configured to:
      receive, via the receiver, a network connection failure indication;
      perform a connection change procedure in response to having received the network connection failure indication; and
      receive a pre-configured handover configuration only before receiving the network connection failure indication, the pre-configured handover configuration comprising a candidate target cell, and performing a handover procedure based on the pre-configured handover configuration further comprising connecting to the candidate target cell in response to having received the network connection failure indication,
   wherein the processor is further configured to receive the network connection failure indication via downlink signaling.

* * * * *